Patented Jan. 30, 1923.

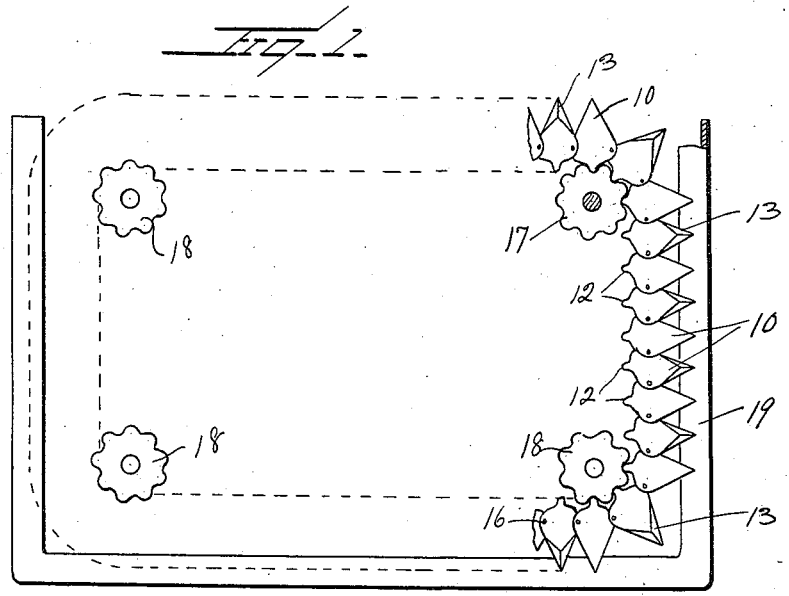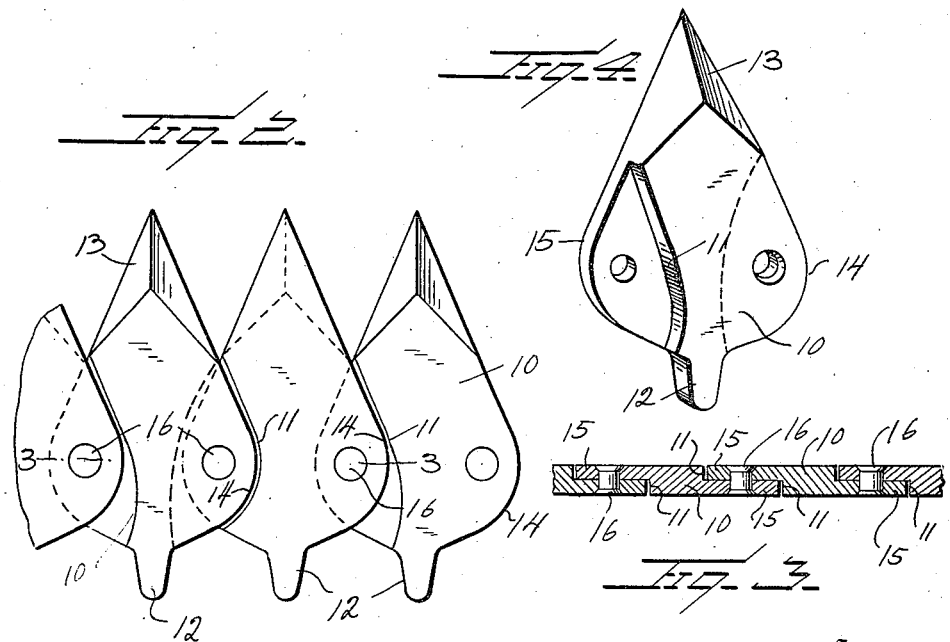

1,443,914

UNITED STATES PATENT OFFICE.

WINNIFRED FRANCIS ELLISON, OF MANCHESTER, NEW HAMPSHIRE.

WOOD-CUTTING SAW.

Application filed May 12, 1920. Serial No. 380,839.

*To all whom it may concern:*

Be it known that I, WINNIFRED FRANCIS ELLISON, citizen of the United States, residing at Manchester, in the county of Hillsborough and State of New Hampshire, have invented certain new and useful Improvements in Wood-Cutting Saws, of which the following is a specification, reference being had to the accompanying drawings.

This invention relates to saws, and particularly to chain saws for cutting wood.

The general object of the invention is the provision of a chain saw in which the chain is made up of a plurality of teeth pivotally connected to each other so that the chain is flexible and adapted to pass around suitable driving and idle sprocket wheels, whereby the chain may be caused to travel in a closed path.

A further object is to provide a construction of this character wherein the chain is formed of a series of teeth, the teeth being interchangeable and detachable.

Another object is to so form the teeth that the inner or butt ends of the teeth will form sprocket teeth engageable with a series of driving and idle sprockets.

Still another object is to so form the teeth that the bevelled surfaces of the teeth come alternately on opposite sides of adjacent teeth to thereby give the correct set to the saw.

Other objects will appear in the course of the following description.

My invention is illustrated in the accompanying drawings, wherein:—

Figure 1 is a fragmentary plan view of a saw table with my improved saw applied thereto;

Figure 2 is a face view of a portion of a band saw constructed in accordance with my invention;

Figure 3 is a section on the line 3—3 of Figure 2;

Figure 4 is a perspective view of one of the teeth of the saw.

Referring to these drawings, it will be seen that my improved saw consists of a chain formed of a plurality of individual teeth 10. One of these teeth is shown in Figure 4. As all the teeth are alike, the description of the tooth shown in Figure 4 will apply to all of the teeth. Each tooth is approximately arrow-shaped in form, and the opposite faces of each tooth on opposite sides of the medial line of the tooth are reduced in thickness, as at 11, the inner edge of each reduced portion being concavely rounded. The butt end of the tooth is provided with a projecting lug 12. These lugs 12, when the teeth are joined together, form sprocket teeth, as illustrated in Figure 1, engageable with the recesses between the teeth of a sprocket wheel. One face of each tooth is entirely flat, except for the recess 11 on that face, and the opposite face of the tooth is oppositely bevelled at its apex, as at 13, to form a double cutting edge on the tooth. The teeth, when assembled as illustrated in Figure 2, are set so that these cutting edges extend in opposite directions, that is the bevelled face 13 on one tooth extends in an opposite direction from the bevelled faces 13 on the next adjacent teeth.

As will be seen in Figure 2, each tooth has its lateral edges convexly rounded, as at 14, and when the teeth are assembled, the reduced portions 15 of one tooth are overlapped upon the reduced portions 15 of the next adjacent teeth, in the manner illustrated in Figure 3, so that the convexly curved edge face 14 confronts the concave edge face of the recess 11 so that the teeth at the point where they are connected have the same thickness as the body of each tooth. The teeth are connected by rivets 16 which permit the teeth to rock with relation to each other.

As is clearly shown in Fig. 4 of the drawings, each individual tooth is bevelled on one side toward the edges of the tooth and likewise has its side faces tapering from the beginning of the bevel and in the opposite direction. The teeth are arranged in the chain with the beveled faces of alternate teeth turned in opposite directions.

The chain formed of the teeth as heretofore described passes from a driving sprocket wheel 17 over idler sprocket wheels 18. The path through which the chain moves may be of any desired shape, but I have illustrated it as rectangular, and I have illustrated the teeth of the saw as passing over a channel iron saw frame 19 along three sides of the path of travel of the saw.

The particular construction of the teeth illustrated provides a chain saw which is very flexible and which may be readily driven and in which the teeth are interchangeable so that any one tooth or any number of teeth may be readily removed and replaced with sharpened teeth or unbroken teeth.

It will be obvious that with this construction the saw may travel in either direction or that the teeth may be readily reversed when one cutting edge is worn, or that the whole set of teeth forming the band may be reversed when one cutting edge is worn, to thereby secure a double life for the teeth. It will be, of course, seen that when the teeth turn corners, they will rotate with relation to each other in the manner illustrated in Figure 1 so that the lugs 12 will be brought closer to each other and the points of the teeth farther apart.

It will also be noted that when the teeth have passed around the sprocket wheel the points of the teeth will extend at right angles to the direction of movement of the teeth and that when in this position the straight edges of the teeth will contact with the straight portions of the shoulders of the recesses. When in this position the lead of the chain saw presents a substantially rigid blade throughout the cutting area for the reason that any tendency of the teeth to rotate will be prevented by the engagement of the edge of the teeth with the shoulders of the adjacent recesses. This is true whether the saw is driven in one direction or the other.

I do not wish to be limited to any particular construction of the table or mounting for the saw, or to any particular means for driving this saw.

It will be seen that I have provided a chain saw formed of single teeth pivoted to each other, each tooth being reversible and interchangeable, with a tooth or sprocket drive, and that this saw may be used for cutting different materials, such as wood, iron, stone, metal, etc., and for either a cross cut saw or a rip saw, of course the form of the teeth being changed for cutting different materials.

The advantages of my saw are as follows: It is much easier to repair a chain tooth saw if a tooth be broken than with the ordinary band saw. It does not require an expert mechanic to repair this saw and takes but a relatively short time, as a section of a dozen teeth may be readily replaced, or one tooth may be as readily replaced. Further, my saw does the work of an ordinary band saw and does not require as large a pulley for driving it as the band saw. This saw is flexible and rolls on its pivots and does not bend, which will give the steel a longer life than ordinary band saws wherein the steel of the saw is bent as it passes around the pulleys. Furthermore only relatively small pulleys are necessary for driving this saw, whereas in an ordinary band saw pulleys five or six feet in diameter are required.

It is to be noticed that the curvature of the backs of the teeth, that is those portions of the teeth adjacent the sprocket lugs 12, is such as to give the required freedom to the teeth to rock on their pivots as much as desired, but it will be obvious that the wall 11 might be made concentric to the pivot pin 16 so as to permit full freedom of oscillation of one tooth with relation to the other within a very wide limit.

I claim:—

1. A reversible chain saw comprising a series of overlapping teeth, the edges of each tooth diverging from the point thereof symmetrically in respect to the median axis of the tooth and merging into curved edges bounding the body portion of the tooth, complementary recesses in the overlapping portions of successive teeth having walls of a depth to cause the respective faces of successive teeth to lie in the same planes, each tooth being beveled on one side toward said edges and having its side faces tapering from the beginning of the bevel and in the opposite direction and the beveled face of alternate teeth being turned in opposite directions, means pivotally connecting said overlapping portions together and means on said teeth adapted to be engaged by a driving instrumentality.

2. A reversible and interchangeable tooth for a chain saw having straight edges diverging from the point of the tooth symmetrically in respect to the median axis of said tooth and merging into curved edges bounding the body of the tooth, similar recesses in opposite faces of the tooth extending inwardly from said circular edge portions presenting shoulders complementary to the straight edge portions of the tooth and pivot-receiving apertures concentric with a part of said curved edge portions, said tooth being beveled on one side toward said edges and having its side faces tapering from the beginning of the bevel and in the opposite direction.

3. A reversible and interchangeable tooth for a chain saw having straight edges diverging from the point of the tooth symmetrically in respect to the median axis of said tooth and merging into curved edges bounding the body of the tooth, similar recesses in opposite faces of the tooth extending inwardly from said circular edge portions presenting shoulders complementary to the straight edge portions of the tooth and pivot-receiving apertures concentric with a part of said curved edge portions, the point of said tooth being formed by beveled portions merging into cutting edges on the same face of the tooth, said tooth being beveled on one side toward said edges and having its side faces tapering from the beginning of the bevel and in the opposite direction.

In testimony whereof I hereunto affix my signature.

WINNIFRED FRANCIS ELLISON.